(12) United States Patent
Mauri Lopez

(10) Patent No.: US 9,847,626 B2
(45) Date of Patent: Dec. 19, 2017

(54) CONTAINER BASED BY-PASS MODULE FOR ELECTRIC POWER LINES

(71) Applicant: PRYSMIAN S.P.A., Milan (IT)

(72) Inventor: Manuel Mauri Lopez, Milan (IT)

(73) Assignee: PRYSMIAN S.P.A, Milan (IT)

( * ) Notice: Subject to any disclaimer, the term of this patent is extended or adjusted under 35 U.S.C. 154(b) by 183 days.

(21) Appl. No.: 14/758,017

(22) PCT Filed: Dec. 28, 2012

(86) PCT No.: PCT/EP2012/077055
§ 371 (c)(1),
(2) Date: Jun. 26, 2015

(87) PCT Pub. No.: WO2014/101952
PCT Pub. Date: Jul. 3, 2014

(65) Prior Publication Data
US 2015/0349507 A1     Dec. 3, 2015

(51) Int. Cl.
| H02B 1/52 | (2006.01) |
| H02H 9/00 | (2006.01) |
| H02G 1/02 | (2006.01) |
| H02G 11/02 | (2006.01) |
| H02B 5/00 | (2006.01) |

(52) U.S. Cl.
CPC .................. *H02B 1/52* (2013.01); *H02G 1/02* (2013.01); *H02G 11/02* (2013.01); *H02H 9/005* (2013.01); *H02B 5/00* (2013.01); *Y10T 29/49197* (2015.01)

(58) Field of Classification Search
CPC .... B65H 75/00; B65H 75/44; B65H 75/4402; B65H 75/4418; B65H 75/4421; B65H 75/4423; H02G 11/00; H02G 11/02
See application file for complete search history.

(56) References Cited

U.S. PATENT DOCUMENTS

| 2,237,812 A | 4/1941 | De Blieux |
| 4,367,512 A | 1/1983 | Fujita |

(Continued)

FOREIGN PATENT DOCUMENTS

| CN | 201937194 | 8/2011 |
| CN | 202217944 | 5/2012 |

(Continued)

OTHER PUBLICATIONS

Silec Cable: "High and Extra High Voltage 63 to 225KV Stand-By Links", Ref. HVSBL, Jan. 2006, pp. 1-19, (2006).

(Continued)

*Primary Examiner* — R. J. McCarry, Jr.
(74) *Attorney, Agent, or Firm* — Finnegan, Henderson, Farabow, Garrett & Dunner, L.L.P.

(57) ABSTRACT

A by-pass module for power lines includes a container having a housing space, three reels rotatable around rotation axes and housed into the housing space, single phase link for each reel having a first end termination and a second end termination, each single phase link being wound on a respective reel for being unwound from the first end termination, a driving unit for each reel designed for rotating the reel in an unwinding direction allowing the relevant single phase link to be unwound from the reel, and in a winding direction allowing the relevant single phase link to be wound on the reel.

14 Claims, 3 Drawing Sheets

(56) References Cited

U.S. PATENT DOCUMENTS

| | | | |
|---|---|---|---|
| 5,316,492 A | | 5/1994 | Schaareman |
| 5,913,487 A | * | 6/1999 | Leatherman ........... H02G 11/02 191/12.2 R |
| 6,356,428 B1 | | 3/2002 | Akervall et al. |
| 7,931,133 B2 | * | 4/2011 | Vannest ............. B65H 75/4463 191/12.2 R |
| 2007/0045073 A1 | | 3/2007 | Cao et al. |

FOREIGN PATENT DOCUMENTS

| | | |
|---|---|---|
| DE | 2 251 253 | 5/1974 |
| FR | 2 698 737 | 6/1994 |
| SU | 45681 | 1/1936 |

OTHER PUBLICATIONS

International Search Report from the European Patent Office for International Application No. PCT/EP2012/077055, dated Aug. 23, 2013.

Written Opinion of the International Searching Authority from the European Patent Office for International Application PCT/EP2012/077055, dated Aug. 23, 2013.

* cited by examiner

CONTAINER BASED BY-PASS MODULE FOR ELECTRIC POWER LINES

CROSS REFERENCE TO RELATED APPLICATION

This application is a national phase application based on PCT/EP2012/077055, filed Dec. 28, 2012, the content of which is incorporated herein by reference.

FIELD OF THE INVENTION

The present invention relates to a by-pass module for electric power lines.

BACKGROUND OF THE INVENTION

Power lines are used for transporting the electric energy from generating power plants to electric substations and, in case of alternate current (AC) transported at high voltage (HV; typically higher than 30-35 kV) three-phase cables are typically used.

Ordinary and extraordinary maintenance need to be performed on power lines, especially in the substations, where voltage is transformed from high to low, or the reverse, overhead power lines are connected to cabled lines, and several other functions of the electric network are performed. Maintenance of the power lines can imply, for refurbishment and reconstruction of tower and overhead power lines; restoration or expansion in substations; inspection and/or replacement of power transformers, circuit breakers, switchgears, shunts, or other components of a substation. Such operations are performed by disconnecting all the components involved in the maintenance activity from the electric transmission line. Temporary by-pass systems linking input and output points within the substations are used in order to guarantee the continuity of electric power supply to the users during the maintenance period. Typically, the by-pass systems are constituted by several elements, as described, for example, in HVSBL January 2006 by Silec Cable (www.sileccable.com/Portals/france/pdf/en/2151_HVSBL.pdf).

According to this publication, a three phase High Voltage Stand-By Link (HVSBL) system is composed of three lengths of cable equipped with two synthetic terminations pre-mounted in factory; three dedicated drums allowing storage, transportation and unwinding and rewinding of the lengths equipped with their terminations; six metallic structures for supporting the terminations during use (optional).

The illustrated link systems are conditioned on dedicated metallic drums fitted out to contain and protect the cable equipped with its two terminations. A three phase link system may comprise from one single drum of 2.6 m in diameter equipped with three compartments allowing to install on the same drum the three phases of a 90 kV HVSBL of 20 m, to three specific drums of 4.7 m each one containing one phase of a 225 kV HVSBL of 350 m. Generally, the terminations are installed in protections (tube or underframe) positioned and fastened on the inner side of the drum (for transportation). Termination length increases with voltage and can be comprised between 1.8 m for 90 kV and 2.8 m for 225 kV. The possibilities offered as regards lengths and reels are extensive but if important lengths (higher than 200 m) are chosen, it is necessary to plan special means for unloading, unwinding and transportation; as such, the period of implementation may be affected. Drums delivered, laying equipment and routine tools are transported by truck from a storage yard to the installation site.

The installation procedure of links for a three-phase network comprises the following steps:
unloading three drums, each carrying a phase link, from a truck by a crane;
unwinding the cable length of each link from the drum and lay it down to the site of connection of the outdoor termination thereof;
providing the site of connection with a supporting structure for each outdoor termination of each link;
connecting each outdoor termination to the overhead network line and the other cable end to another power line.

This procedure takes a substantial amount of time and staff, and this is a critical, especially in case of a line failure to be restored.

Due to the necessity of maintaining or repairing power lines, by-passing certain positions or points of an electric energy transmission line is usually a mandatory operation to guarantee safe condition and to guarantee the electric power supply to the users.

The Applicant has observed that it would be advantageous to have short operating time for providing by-pass on power lines.

In particular, the Applicant has tackled the problem of providing a by-pass module for power lines which requires shorter time and few staff for being installed in the field, compared with conventional ones.

SUMMARY OF THE INVENTION

The Applicant found that the above mentioned problems can be solved by a by-pass module for AC HV electric lines transportable to the site of connection with the power line and comprising reels (one for each phase) bearing respective phase links immediately ready for being unwound.

In particular, the Applicant has found that quick installation of a by-pass module can be obtained by arranging one reel for each phase into a container and by providing each reel with a dedicated driving unit for unwinding and winding the respective extension cable.

In one aspect, the present invention relates to a by-pass module for power lines comprising
a container having a main housing space,
at least one reel rotatable around a rotation axis and mounted into the housing space,
a single phase link wound on the reel and comprising a cable length, a first end termination and a second end termination,
a driving unit for the reel designed for rotating the reel in an unwinding direction and in a winding direction.

Advantageously, the housing space of the by-pass module of the invention contains three reels, each bearing a single phase link and each rotatable around a relevant rotation axis by a relevant driving unit.

The container allows the single phase links to be contemporaneously, easily and quickly placed in the site wherein a power line needs to be bypassed. This allows avoiding the need to perform a direct management of each reel as independent parts of a by-pass link and allows avoiding mounting each reel on a dedicated holding structure for unwinding the cables.

The unwinding direction allows the single phase link to be unwound from the reel, while the winding direction allows the single phase link to be wound on the reel.

The driving units allow the extension cables to be easily and quickly unwound without the need of exposing the staff to dangerous management of the reels.

Conveniently, the container is designed to be transportable.

The by-pass module of the invention is suitable for by-passing a section of an electric line, preferably wherein at least one by-pass point is overhead.

The by-pass module of the invention is particularly advantageous when used on high voltage electric lines in the range between 30 kV and 150 kV. However, the by-pass module of the invention can be used also on very high voltage electric lines, wherein by very high voltage it is meant a voltage higher than 150 kV.

The container conveniently comprises a base wall, a top wall opposite to the base wall, two major sidewalls and two minor side walls connecting the base wall to the top wall, the major sidewalls being longer than the minor sidewalls.

One of the side walls, preferably one of the major sidewall, is movable for forming a side opening, for allowing easier access to the main housing space when the module is in the active position. More preferably at least two, opposite sidewalls of the container are movable to form an opening.

The secondary housing space is physically divided from the housing space by a dividing wall preferably extending between two sidewalls and between the base wall and the top wall.

As "end termination" it is meant an electric apparatus joined to the cable end and suitable for electrically connecting the cable to another electric apparatus.

The first and second end terminations of the module of the invention can be an outdoor termination or a prefabricated cable joint. Preferably at least one of the first and second end terminations is an outdoor termination.

Preferred outdoor terminations are flexible outdoor terminations.

Preferred prefabricated cable joints are plug-in cable joints.

Advantageously, the container of the invention can comprise a secondary housing space.

Advantageously, the by-pass module of the invention further comprises a fitting kit, preferably housed into the secondary housing space. The fitting kit can comprise accessories for mechanically and/or electrically backing at least one of the first and second end terminations.

Conveniently, the fitting kit is stored in the secondary housing space of the container.

Preferably, the fitting kit comprises, for each reel, a surge arrester, a connecting rod designed for mechanically connecting the surge arrester to an outdoor termination, and bearing elements for mechanically coupling the surge arrester to a portion of the container.

The container advantageously comprises support elements provided on the top wall thereof, the support elements being designed for holding the accessories of the fitting kit in operative position.

Conveniently, each driving unit is designed for operating on the respective reel independently from the remaining driving units. Preferably, each reel comprises a substantially cylindrical bearing surface on which the single phase link is wound, the bearing surface being delimited by substantially annular flanges extending away from the bearing surface. Conveniently, each driving unit engages at least one flange of a respective reel for rotating the reel around the relevant rotation axis.

Preferably, the driving unit comprises at least one motorized roller contacting a rim of the flange, the motorized roller (13) being designed to rotate the flange around the rotation axis. The flange rests on the motorized roller and on an idle roller, and the motorized roller and the idle roller are spaced apart for supporting said reel within the container.

Conveniently, the motorized roller and the idle roller are provided on a lug extending from the base wall of the container. Each reel is supported within the container only through the flanges each of which contacts a respective idle roller and a respective motorized roller.

Preferably, each driving unit comprises an electric motor and a transmission cinematically connecting the electric motor with two of the motorized roller.

In a second aspect the present invention relates to method for operating a by-pass of a power line comprising:

providing a by-pass module comprising a container having a housing space, at least one reel rotatable around a rotation axis and mounted into said housing space, one single phase link wound on the reel and comprising a cable length, a first end termination and a second end termination, a driving unit for the reel designed for rotating the reel in a unwinding direction and in a winding direction;

disposing said container;

moving at least one sidewall of the container for accessing to the reel and operating said driving units for unwinding the single phase link;

electrically connecting the end termination of the single phase link to two points of the power line.

Preferably, the method further comprises stably fixing a surge arrester on the top wall of the container and connecting a flexible outdoor termination, prefabricated on the first or second end termination of the single phase link, to the surge arrester.

In the case the housing space of the by-pass contains three reels the method according to the invention can be carried out on each reel in different moments or substantially at the same time.

Within the present description, the term "transportable" means designed for being transferred from a place, for example a remote storage, to the place of operation.

The term "outdoor termination" as used herein refers to a component in which an end of an insulated electric cable is accommodated, having a connector for connection with an aerial electric line, connected with a cable conductor, and an insulation and screening structure suitable for providing insulation between the connector and the earth. The term "flexible" outdoor termination as used herein refers to an outdoor termination, which can be elastically bent by an amount enabling it to be wound around a reel. Preferably, this termination is of the dry type (substantially free from flowable filler) and, more preferably, comprises silicone sheds. These terminations are typically operable with voltage up to 145 kV.

Within the present description, with "active position" or "operating position" it is meant a position in which the by-pass module is ready for allowing a single phase link to be connected to a power line. In this position the by-pass module and the single phase link thereof are arranged for operating in the line, both from a mechanical and the electrical point of view.

Within the present description, with "stand-by position" it is meant a position in which the by-pass module and the single phase link thereof are configured for storage and/or transportation.

Within the present description, as "cable length" is intended a span of insulated electric cable, unless otherwise specified.

Within the present description, with "surge arrester" it is meant a device designed for protecting insulation and conductor of an electric apparatus in case of overvoltage.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

BRIEF DESCRIPTION OF THE DRAWINGS

The present invention will be now described more fully hereinafter with reference to the accompanying drawings.

DETAILED DESCRIPTION

Figure 1:
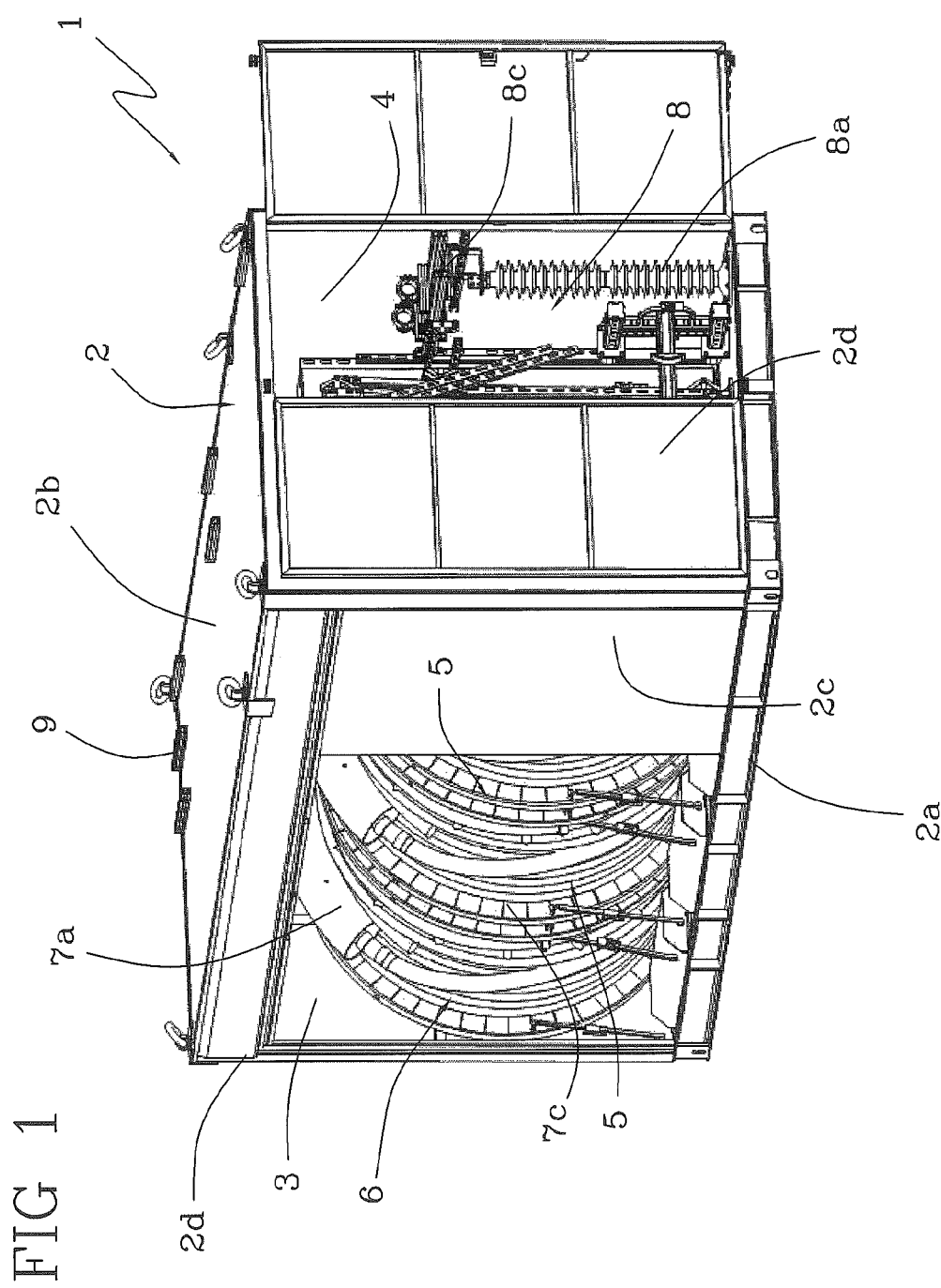
FIG. 1 is a schematic perspective view of a by-pass module for power lines, according to the present invention.

With reference to the annexed figures, reference 1 globally denotes a by-pass module for electric power lines in accordance with the present invention.

The by-pass module 1 shown in the figures is an example for use on 145 kV lines and the relevant substations.

The by-pass module 1 comprises a container 2 having a main housing space 3. The container 2 is conveniently made in the form of a rigid frame having the size of a freight container, as for example a LC-20 sized container, so that it can be transported on a trailer, or, alternatively it can itself be equipped with a plurality of wheels so as to form a trailer or semitrailer.

The container 2 conveniently comprises a base wall 2a, a top wall 2b opposite to the base wall, two major sidewalls 2c and two minor sidewalls 2d connecting the base wall to the top wall. Such walls form a containment delimiting the main housing space 3.

In the container 2, one of the major sidewalls 2c is movable for forming a side opening.

Figure 2:
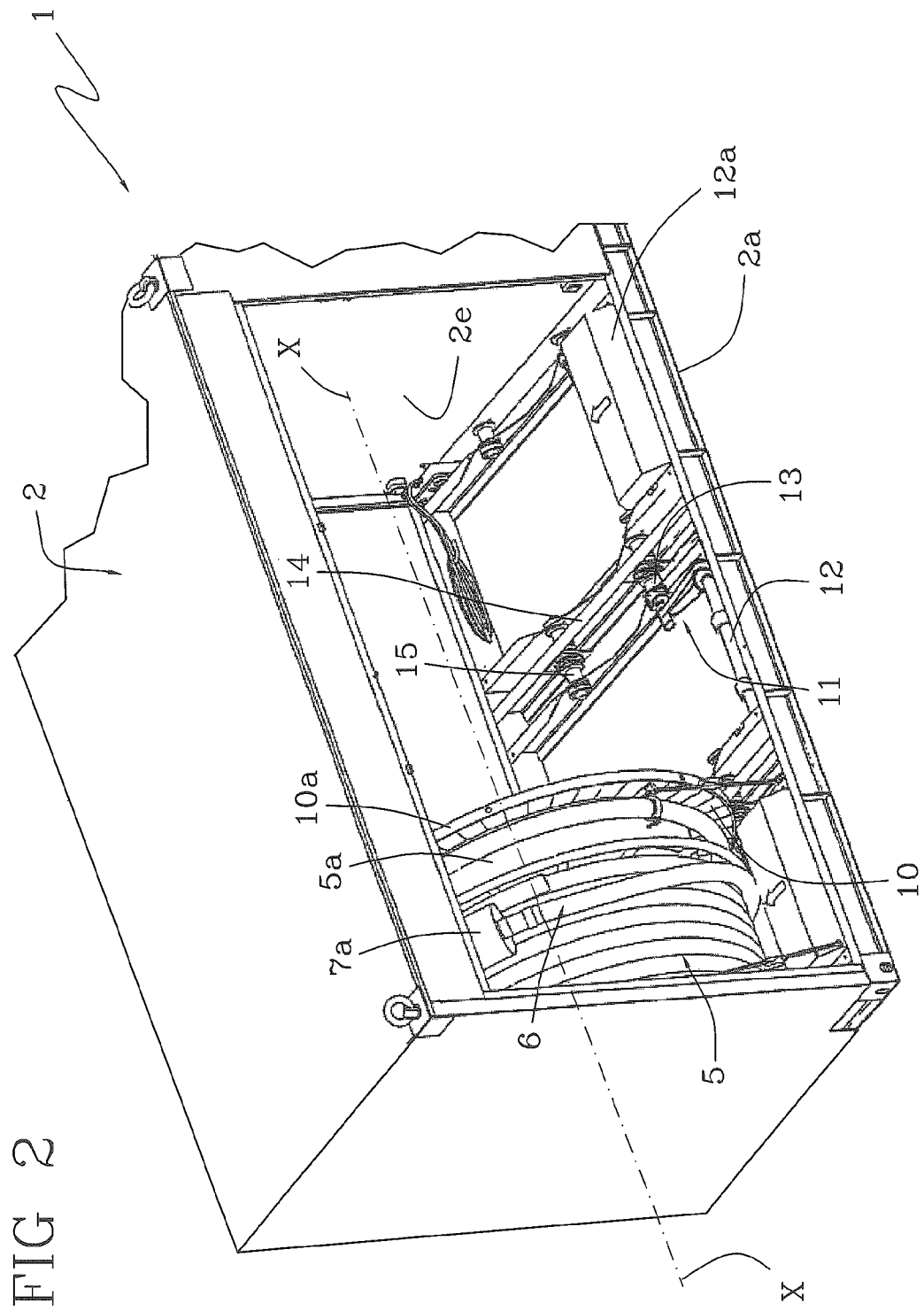
FIG. 2 is a schematic perspective view of some details of the by-pass module of FIG. 1.

In the preferred embodiment the container 2 presents a secondary housing space 4 preferably adjacent to the housing space 3. The secondary housing space 4 is physically separated from the housing space 3 by a dividing wall 2e (illustrated in FIG. 2) extending between two major sidewalls 2c and between the base wall 2a and the top wall 2b. The minor sidewall 2d in correspondence with the secondary housing space 4 is movable for forming a side opening, so allowing easier access to the secondary housing space 4.

Three reels 5, one for each phase, are arranged within the main housing space 3 of the container 2. A single phase link 6 is wound on each reel 5. Each single phase link 6 comprises a first end termination 7a, a second end termination 7b (FIG. 3) arranged beneath the relevant cable length 7c when the latter is wound around th reel 5. The phase link 6 is unwound from the reel 5 starting from the first end termination 7a. Each phase link 6 is designed for being completely unwound from the respective reel 5, so that both the end terminations 7a, 7b can be directly reached. The first and second end terminations 7a, 7b are ready for being connected to respective electric devices of the power line by-pass. In the embodiment depicted in FIG. 1, the second end termination 7b is a flexible outdoor termination, suitable for connecting to a proximate overhead point of the power line. In case the other, distal, point of the power line to be bypassed is an overhead point, also the first end termination 7a of each single phase link 6 is a flexible outdoor termination (as in the embodiment of FIG. 1) or, alternatively, with a relevant joint suitable for being connected to a stand-alone outdoor termination. In case the distal point of the power line to be bypassed is a point on the ground (or underground), the first end termination 7a is a relevant ground (or underground) joint. In case both the points to be by-passed are points on the ground (or underground), both the end terminations of each single phase link 6 are equipped with relevant ground (or underground) joints. When at least one point of the power line to be bypassed is a point on the ground (or underground), one of the first end termination 7a and second end termination 7b of each single phase link 6 is a prefabricated cable joint, for example as described in U.S. Pat. No. 5,316,492 and commercially available under the trademark CLICK FIT® (for example the model CFJ-CFJX) sold by the Applicant.

Figure 3:
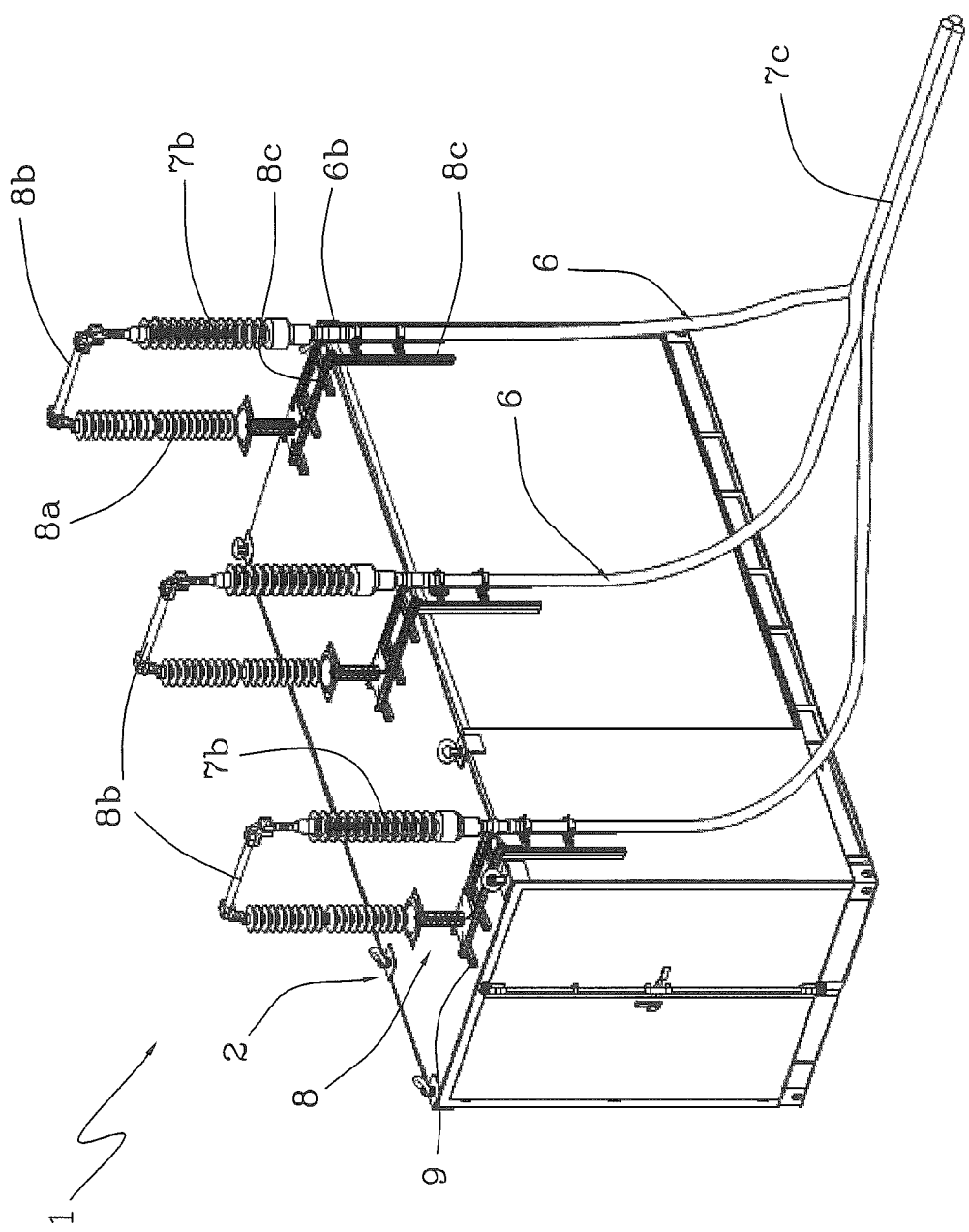
FIG. 3 is a schematic perspective view of the by-pass module of FIG. 1 in a possible operative condition.

In order to allow an easy and correct connection of each of the three single phase link 6 to the power line, the module 1 further comprises a fitting kit 8 designed for being mechanically and/or electrically connected to at least one of the first end termination 7a and second end termination 7b of each single phase link 6. Conveniently, the fitting kit 8 is stored in the secondary housing space 4 of the container 2 for being promptly available when the module has to be configured in the operating position (FIG. 3). When one point of the power line to be bypassed is an overhead point, the fitting kit 8 can comprise, for each single phase link 6, accessories such as a surge arrester 8a, a connecting rod 8b and bearing elements 8c.

The container 2 further comprises support elements 9 provided on the top wall 2b of the container and designed for holding the accessories of the fitting kit 8 in operative position (FIGS. 1 and 3).

The reels 5 are arranged within the housing space and are rotating therein, so that each single phase link 6 can be unwound and wound by rotating the relative reel. As detailed in FIG. 2, preferably, each reel 5 has its rotation axis X parallel to the base wall 2a of the container 2 and parallel to the movable sidewall 2c of the container. Each reel 5 comprises two flanges 10, having a substantial annular shape, delimiting the overall size of the reel. One flange 10 is present at each lateral end of a cylindrical bearing surface 5a of each reel 5 on which the single phase link 6 is wound. The reels 5 are supported within the container 2 by the respective flanges 10, preferably by the respective flanges 10 only.

Advantageously, the flanges 10 are interlocked with driving units 11. Preferably, the module comprises three driving unit 11 each respectively interlocked with the flanges 10 of a sole reel 5. Each driving unit 11 comprises an electric motor (not shown) designed to rotate a driving shaft 12 extending from the base wall 2a of the container 2 between two flanges 10 of the same reel.

The driving shaft 12 is mechanically connected, for example through a driving belt, to a couple of rollers 13, so motorizing the rollers 13. A guard 12a covers the driving shaft 12 and the relevant driving belt. Each motorized roller 13 of a respective driving unit is rotating and supported by a lug 14 emerging from the base wall 2a of the container 2. The lug 14 also supports a rotating idle roller 15 spaced apart from the motorized roller 13 along the lug 14. Each flange 10 rests on one idle roller 15 and on one motorized roller 13, so that a circumferential rim 10a of the flange 10 directly contacts the two rollers 13, 15. Preferably, the rotation axes of the rollers 13, 15 are parallel to the rotation axis X of the reels 5. The motorized rollers 13 are electrically energized to rotate and transmit such rotation to the flanges 10 and, accordingly, the reel 5. To this end, the module 1 comprises a control panel (not shown) designed for actuating the electric motors. Preferably, the control panel comprises independent controllers for each electric motor, so that each motor can be operated independently from the others.

As already said, the module 1 can be conveniently transported, or stocked, in the operation place for being configured in the operation condition. The module can provide a sufficiently long connection, for example 50 or 100 meters in case of 145 kV electric lines or up to 200-250 meters in case of electric lines of above 45-90 kV.

As shown in FIG. 1, in operation, the movable sidewalls of the container are opened so allowing the access to the housing space housing the reels and to the further housing space housing the fitting devices.

In case one point of the power line to be bypassed is an overhead point and the power line is an high voltage power line, the surge arresters and the bearing elements may be unlatched from the second housing space and mounted on the relative support elements on the top wall of the container, as illustrated in FIG. 3. For example, the support elements 9 are designed to engage with the bearing elements 8c which, in turn, are connectable to a base portion of the surge arresters 8a, so that the surge arresters can be firmly held upright above the top wall 2b of the container. Conveniently, the surge arresters 8a, the bearing elements 8c and the support elements 9 are fastened together through bolts and nuts or similar connecting means. The bearing elements 8c are also designed for supporting the outdoor terminations, so that the latter can be firmly held upright and parallel to the surge arresters 8a. Preferably, the bearing elements acting on the outdoor terminations 7b are also active on a portion of cable 6b for firmly holding the same in position (FIG. 3). The bearing elements 8c can have any shape suitable for performing the above cited function. The connecting rods 8b are designed to be mounted between the top end terminations of the surge arresters and the outdoor terminations, as illustrated in FIG. 3.

Alternatively, in case both power points of the by-pass are ground (or underground) points or in case the power line is a very high voltage power line, the surge arresters and the bearing elements may be left into the container.

Any case, each single phase link 6 is then unwound from the respective reel by operating the driving units. During these operations, one end termination, preferably the first end termination 7a, of each single phase link 6 is transported in the proximity of the distal point of the by-pass, the other end terminations 7b remaining in the nearness of the container 2. The end terminations 7a transported to the distal point of the by-pass can be electrically connected to the by-pass point through an outdoor termination supported by a pylon, or through a ground or underground electric junction or through a flexible pre-mounted outdoor termination (depending on the type of by-pass point and on the voltage of the power line).

In case the point of the by-pass near to the container is a overhead point (of a high voltage power line), and thus the surge arrester and the bearing elements have been mounted on the top wall of the container, the flexible outdoor terminations of each second end termination 7b are mounted on the relevant bearing elements. Then the connecting rods are mounted between the top portions of the surge arresters and of the flexible outdoor terminations for mechanically and electrically joining the same. Alternatively, these end terminations 7b can be electrically connected to the by-pass point through outdoor terminations supported by relevant pylons, or through ground or underground electric junctions (depending on the type of by-pass point and on the voltage of the power line).

In operation, the three single phase link 6 are preferably laid close each other and latched together in a trefoil arrangement, so forming a single cord, as illustrated in FIG. 3.

Once these operations have ended, the by-pass module is ready to be electrically connected to the electric line to be by-passed.

The invention claimed is:

1. A by-pass module for an electric power line comprising:
    a container having a housing space;
    at least one reel rotatable around a rotation axis and mounted into the housing space of the container;
    a single phase link wound on the reel and comprising a cable length, a first end termination and a second end termination; and
    a driving unit for the reel designed for rotating the reel in an unwinding direction, and in a winding direction, wherein the driving unit engages at least one flange for rotating the reel around the rotation axis and further comprises at least one motorized roller contacting a rim of the flange.

2. The by-pass module according to claim 1, wherein three reels are mounted into the housing space, each reel bearing a single phase link and being rotatable around a relevant rotation axis by a relevant driving unit.

3. The by-pass module according to claim 2, wherein the driving unit is designed for operating on a respective reel independently from remaining driving units.

4. The by-pass module according to claim 1, wherein at least said second end termination of the single phase link is a prefabricated flexible termination.

5. The by-pass module according to claim 1, wherein the reel comprises a substantially cylindrical bearing surface on which the single phase link is wound, said bearing surface being delimited by substantially annular flanges extending away from said bearing surface.

6. The by-pass module according to claim 1, wherein a flange rests on said motorized roller and on an idle roller, the motorized roller and the idle roller being spaced apart for supporting said reel within said container.

7. The by-pass module according to claim 6, wherein said motorized roller and said idle roller are provided on a lug extending from a base wall of said container, each reel being supported within said container only through said flanges, each of which contacts a respective idle roller and a respective motorized roller.

8. The by-pass module according to claim 1, wherein each driving unit comprises an electric motor and a transmission cinematically connecting said electric motor with two of said motorized rollers, each of said motorized rollers engaging the rim of a respective flange of one reel.

9. The by-pass module according to claim 1, comprising a fitting kit designed for being mechanically and/or electrically connected to at least one of said first end termination and second end termination of each single phase link, said fitting kit being stored in a secondary housing space of said container.

10. The by-pass module according to claim 9, wherein said fitting kit comprises a surge arrester, a connecting rod designed for mechanically connecting said surge arrester to a termination and bearing elements for mechanically coupling said surge arrester to one or more support elements provided on a top wall of said container.

11. The by-pass module according to claim 1, wherein at least one of said end terminations is a prefabricated plug-in cable joint.

12. The by-pass module according to claim 1, wherein said container is designed to be transportable.

13. A method for operating a by-pass of an electric power line comprising:
   providing a by-pass module comprising a container having a housing space, at least one reel rotatable around a rotation axis and mounted into said housing space, one single phase link wound on the reel and comprising a cable length, a first end termination and a second end termination, and a driving unit designed for rotating the reel in an unwinding direction and in a winding direction, wherein the driving unit engages at least one flange for rotating the reel around the rotation axis and further comprises at least one motorized roller contacting a rim of the flange;
   disposing said container;
   moving at least one sidewall of the container for accessing said reels and operating said driving units for unwinding the single phase link; and
   electrically connecting each end termination of the single phase links to two points of the power line.

14. The method according to claim 13, comprising stably fixing surge arresters on a top wall of the container and connecting flexible terminations, prefabricated on said first or second end termination of each single phase link, to said surge arresters.

* * * * *